Patented May 16, 1939

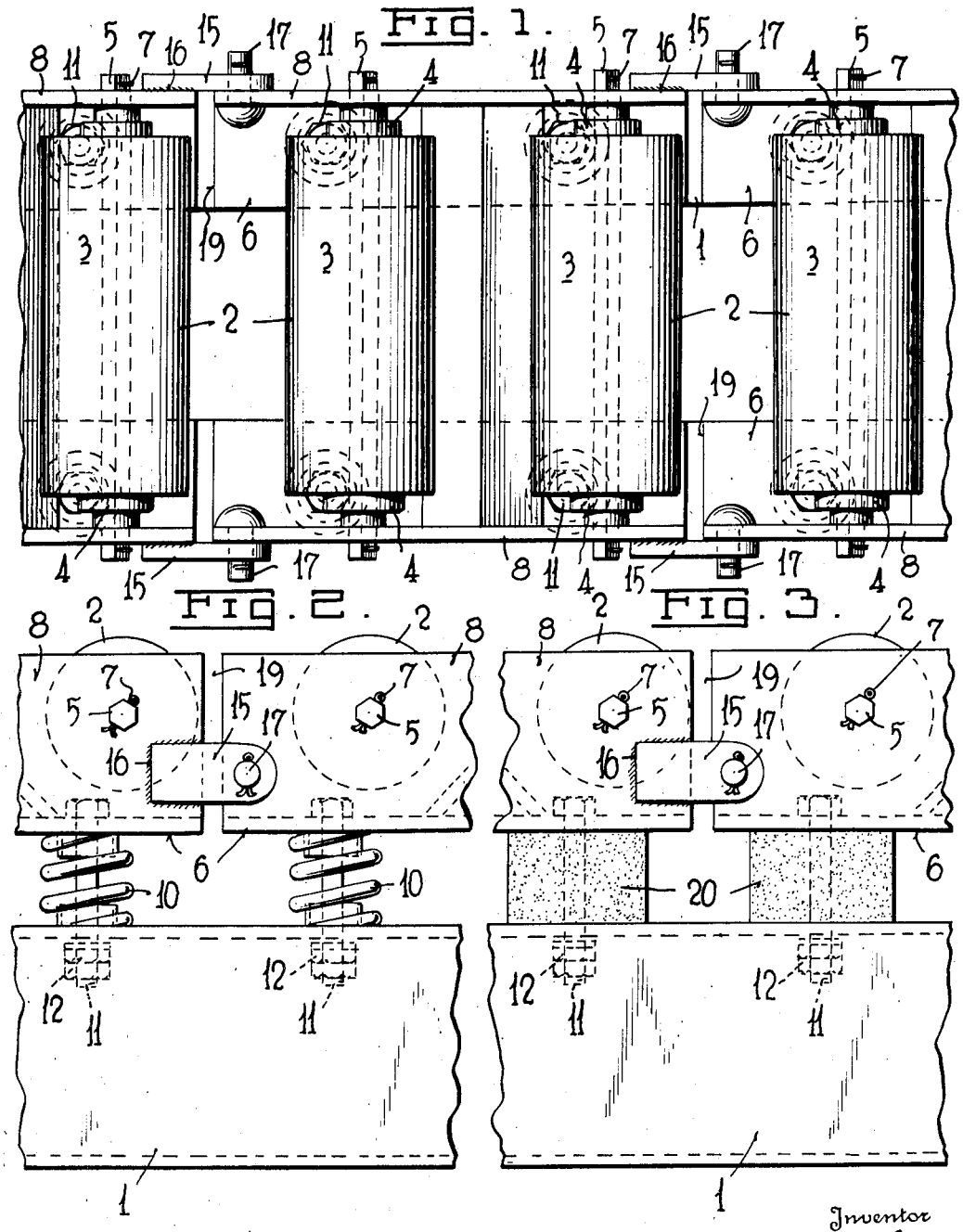

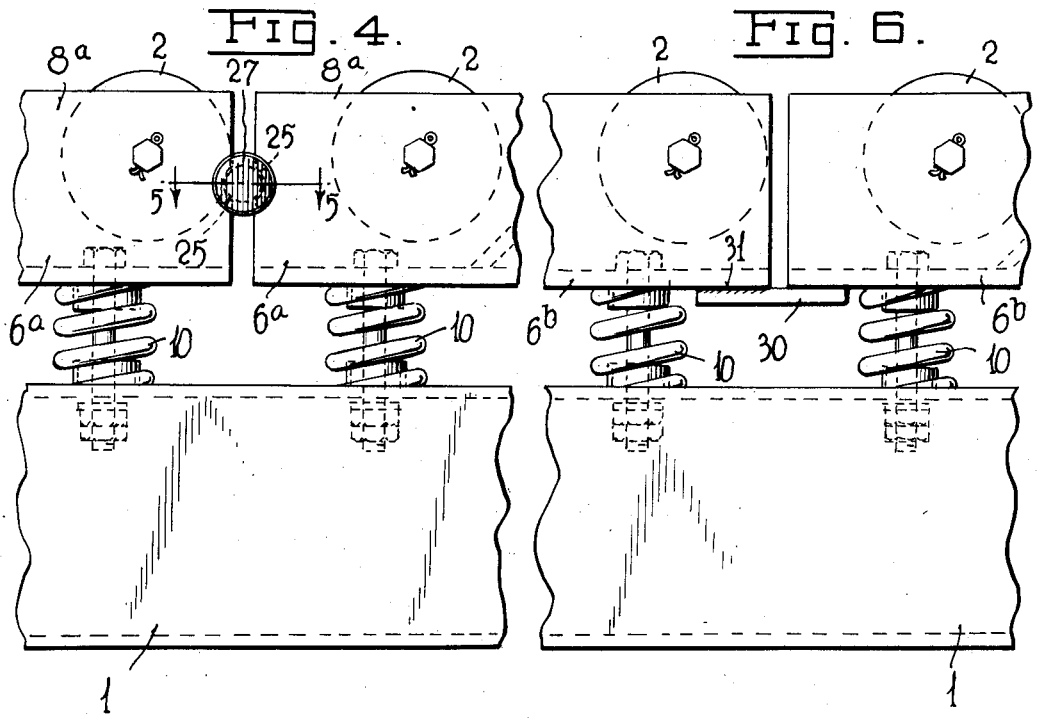
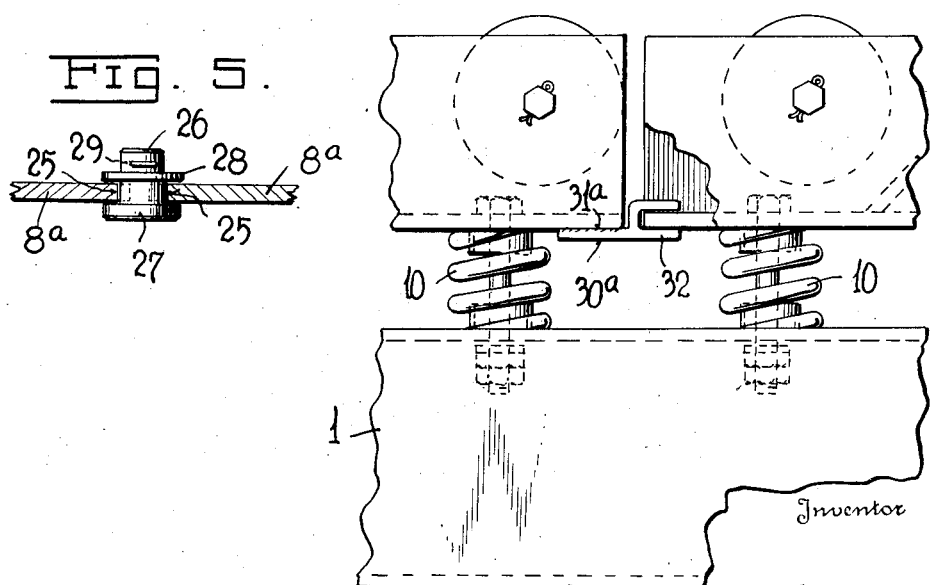

2,158,364

UNITED STATES PATENT OFFICE 2,158,364

ARTICULATED RESILIENT CONVEYER

Arthur M. Hahn, Washington, D. C., assignor to Mathews Conveyer Company, Ellwood City, Pa., a corporation of Pennsylvania Application February 15, 1937, Serial No. 125,916

10 Claims. (Cl. 193—35)

This invention relates to conveyers and is directed more particularly to resilient roller conveyers of the general type similar to those disclosed in the patents to Hubert M. Rishel, Numbers 2,077,188, 2,077,189, and 2,077,190, and in my Patent Number 2,107,822.

The above mentioned patents of Hubert M. Rishel disclose various types of roller conveyers which are resiliently mounted on springs that are pre-compressed independently of the weight of the rollers and associated parts, and the load to be transported over the rollers. My Patent No. 2,107,822 is directed to resiliently mounted conveyers wherein the rollers are resiliently mounted with respect to the main frame supporting the same, by interposing rubber elements between the roller supports and the conveyer frame, thereby providing a self alining conveyer. These rubber elements may or may not be pre-compressed depending upon the degree of resilience desired, the weights of the loads to be transported and other factors.

Rishel contemplates the necessity of pre-compressing the springs in order to obtain a smooth riding surface, and also contemplates pre-compression of such an amount that, as loads pass over the rollers there will not be an appreciable amount of vertical movement. My invention precludes the necessity of pre-compressing the springs by providing an interconnecting means between the roller supports so that the rollers will be depressed in advance of approaching loads to provide a smooth riding surface. By substantially reducing pre-compression, the cushioning effect of the resilient mounting will be more pronounced and thereby compensate for greater inaccuracies in the alignment of the tops of the rollers.

In these resiliently mounted conveyers, it is the prime function of the resilient mounting to permit those rollers which are slightly higher than adjacent rollers that are engaged by the load, to yield in a vertical plane, thereby preventing the bearings of such "high" rollers from being over-loaded as the load passes along the conveyer rollers.

In the aforementioned patents of Hubert M. Rishel, the tops of the conveyer rollers may be substantially alined when the springs supporting the same are pre-compressed. However, due to slight inaccuracies in the manufacture of the steel tubing from which the rollers are made, and more particularly due to the fact that such tubing is not a perfect cylinder, it is obvious that in practical use, each roller will not rotate with its cylindrical surface tangent to the common plane of the tops of the other rollers in the conveyer section. Also in production methods of assembling each roller by swaging the tubular ends thereof over the ball bearing units, it is obvious that slight inaccuracies will prevent the cylindrical outer surface of the roller from rotating as a true cylinder about its axle which extends longitudinally through the same. The above mentioned inaccuracies inherent in roller conveyers are frequently amplified by the abuse to which the conveyers are subjected when in use. While these and other inaccuracies are of a relatively small value, nevertheless, such inaccuracies may be additive if one roller is rotated to its highest position and an adjacent roller is rotated to its lowest position. Without the aforementioned resilient mountings, the "high" rollers would have to carry more than their share of a rigid load passing over the conveyer which would tend to overload the bearings of such "high" roller and eventually cause failure thereof. The resilient mountings, however, permit such high rollers to yield to a common plane with adjacent rollers and thereby eliminate this difficulty.

I have discovered that due to the aforementioned inaccuracies in manufacture of the rollers, and even when the tops of all of the rollers of a resiliently mounted conveyer are alined by pre-compressing the resilient mountings to the necessary extent, as soon as the individual rollers are rotated, the tops thereof are no longer in perfect alinement. Hence a load passing over the conveyer will roll smoothly over the alined rollers but upon engaging a "high" roller, the load will first contact the roller in a horizontal plane below the top surface of such high roller, then tend to ride up on top of the roller until sufficient weight is imposed thereon to cause the resilient mounting therefor to yield and permit the roller to aline with the other rollers supporting the load. It is obvious that in a horizontally disposed conveyer, when the load first strikes the "high" roller, the force of the load is transmitted to such roller in a horizontal direction whereas the resilient mounting is designed to yield primarily in a substantially vertical direction and hence such horizontal force must be resolved into a vertical force, by the rotation of the roller permitting the load to roll up on top thereof. This action of the "high" rollers not only produces an uneven transit of the load over the conveyer but also retards the passage of the load thereover and requires additional force to overcome this retarding action.

The same action as described above takes place when objects having irregular surfaces in contact with the conveyer rollers are passing thereover. In other words, portions of the object which project below the skids supporting the same, or irregular shaped objects in direct contact with the rollers will strike the rollers and depress them as the object moves along the conveyer.

It is the primary object of the present invention to further improve the action of a resiliently mounted conveyer by providing an articulation between adjacent rollers or groups of rollers whereby the roller or group of rollers immediately in advance of the load will be depressed to substantially the level of the rollers supporting the load. In this manner the "high" rollers are depressed before the load engages them and hence such "high" rollers are smoothly engaged by the load and the impact of the aforementioned horizontal force is avoided.

Another object is to provide a resiliently mounted conveyer which shall permit the load to pass smoothly thereover and with minimum effort required to move the load along the conveyer rollers.

Another object is to provide a resiliently mounted conveyer wherein pre-compression of the resilient elements may be materially lessened or entirely dispensed with and still provide a substantially smooth path of travel for the load.

Another object is to provide a self-alining conveyer wherein the rollers are resiliently supported, so that objects having irregular surfaces which are being transported over the conveyer in direct contact with the rollers, or having portions projecting below the skids supporting such object, will permit the rollers to be depressed in accordance with such irregular contour of the hollow surface of the object and thereby distribute the load over a plurality of rollers. In this manner, overloading of the bearings of any particular roller or group of rollers is avoided as well as providing a smoother path of travel for the object over the conveyer.

A further object is to provide a resiliently mounted conveyer wherein the rollers or groups of rollers are interconnected in such manner that a force exerted on one roller or group of rollers will be transmitted to adjacent rollers. This feature is of prime importance in some types of conveyers which are required to withstand severe impacts due to heavy loads being dropped onto the rollers, as for example, in steel mills where heavy billets and other loads weighing as much as 25,000 pounds are often dropped by a crane or electro-magnet onto the conveyer to be transported to another location in the mill. By reason of such interconnections and transmission of these forces, the impact is absorbed by additional rollers other than those actually engaged by the load.

A still further object is to provide an articulated resilient conveyer of the aforesaid character which shall be simple in construction, inexpensive to manufacture, efficient in operation, and which shall be equally well adapted to resilient conveyers of the spring or resilient rubber element type.

The foregoing and other objects and advantages will become more apparent as the description proceeds and will also be pointed out in the appended claims defining my invention.

In the drawings accompanying and forming a part of this application:

Figure 1 is a fragmentary top plan view illustrating a conveyer constructed in accordance with my invention;

Figure 2 is a fragmentary side elevation of a resilient spring mounted conveyer embodying my invention;

Figure 3 is a similar view illustrating my invention applied to a resilient rubber mounted conveyer;

Figure 4 is a similar view illustrating a modified form of interconnection between the roller units;

Figure 5 is a fragmentary sectional view taken in the line 5—5 of Figure 4;

Figure 6 is a fragmentary side elevation of a further modified form of interconnection between the roller units; and Figure 7 is a similar view of a still further modification of such interconnection.

In these drawings which are for the purpose of illustrating certain embodiments of my invention, 1 denotes the main side frames of a conveyer. These side frames are of the usual channel form or any other suitable form. In the present instance, I have shown the main frames arranged with the channels facing each other, although it will be obvious that the channels may face outwardly if desired, as illustrated in my Patent No. 2,107,822.

A plurality of rollers 2 are resiliently supported on the main frames 1, each roller comprising a tubular body portion 3 having anti-friction bearing elements 4 in each end thereof and an axle 5 extending longitudinally therethrough. The end portions of the axles 5 are supported in angle members 6 and retained against longitudinal movement by cotter pins 7. In the present instance, I have illustrated each axle as being prismatic in cross-section and engaging similar apertures in the inner race of each bearing and the upstanding flange 8 of each angle member. It will be understood that each axle is non-rotatably mounted, and that each roller rotates on the anti-friction elements interposed between the inner and outer races of the bearings. 4.

In Figure 2, I have illustrated a resilient mounting similar to that disclosed in the aforementioned applications of Hubert M. Rishel. In this figure, the angle members 6 are supported in spaced vertical relation to the main frames 1 by coiled springs 10 interposed between the horizontal flanges of the angle members 6 and the horizontal top flanges of the channel main frames 1. Bolts 11 and nuts 12 interconnect the angle members 6 and main frames 1 and such bolts preferably pass axially through the coiled springs 10. These bolts not only serve to hold the parts in assembled relation but also may be tightened to pre-compress the coiled springs 10 to any desired degree.

The construction thus far described is partly standard conveyer construction as concerns the rollers, and partly the invention of Hubert M. Rishel as concerns the resilient mounting of the rollers.

The present invention concerns the articulation of adjacent roller units so that forces will be transmitted from one roller unit to an adjacent roller unit in advance of a load passing over the conveyer. As an example of accomplishing such articulation in a resiliently mounted conveyer, I have shown the vertical flange 8 of each angle member 6 provided at one end with a horizontally projecting lug 15 which is rigid therewith. These lugs may be rigidly connected to their respective angle members in any suitable manner, as by welding as indicated at 16. As clearly shown in Figures 1 and 2, the lugs 15 of each angle member project horizontally a distance sufficient to overlap the angle members 6 of an adjacent roller unit and each lug is pivotally connected thereto in any suitable manner, as by a pin 17 extending transversely through the angle member 6 and lug 15. It will be noted also, that a small space indicated at 19 is maintained between adjacent roller units so as to permit each unit to move angularly with respect to its adjacent unit as will be more fully described hereinafter.

In Figure 3, I have illustrated my invention applied to a resilient rubber mounted conveyer similar to that described in my co-pending application filed of even date. In this figure, the aforementioned springs 10 are replaced by resilient rubber pads 20 which may or may not be pre-compressed by the bolts 11 and nuts 12, otherwise the construction is identical with that previously described.

In Figures 4 and 5, I have illustrated a modified form of interconnecting means for adjacent roller supports. In these views, the vertical flanges 8ª of adjacent angle members 6ª are each formed with an arcuate recess 25 and the oppositely facing recesses of adjacent units define an aperture for the reception of a stud 26. As shown in detail in Figure 5, this stud may be provided with a head 27 engaging the outer faces of the vertical flanges 8ª, and a washer 28 and cotter pin 29 engaging the inner faces of said flanges to maintain the stud in position. This form of interconnection provides an articulated joint between adjacent roller units and vertical movement of one roller unit will be transmitted to adjacent units.

In Figure 6, I have illustrated another modification of my invention which is exceedingly simple in construction and inexpensive to manufacture and which is particularly adapted for resilient conveyers wherein the load always moves in one direction thereover. In this form, each roller unit is provided at one end with plates 30 that are fastened, one to each horizontal flange of the angle members 6ᵇ in any suitable manner as by welding indicated at 31. These plates project beneath the horizontal flanges of an adjacent roller unit as clearly shown in Figure 6. It is obvious that a load passing over the conveyer from right to left, as viewed in Figure 6, and causing the roller unit on the right to be depressed on its resilient mountings, will also cause the roller unit adjacent thereto and in advance of the load to be depressed by reason of the horizontal flanges engaging plates 30. These plates being rigidly connected to the advance adjacent roller unit will cause said unit to also be depressed and hence the load will pass smoothly over the conveyer.

In Figure 7, I have illustrated a still further modification of my invention which is similar in principle to that shown in Figure 6 except that this form of interconnection permits the load on the conveyer to be moved thereover in either direction. As clearly shown in Figure 7, a plate 30ª is welded at 31ª to the horizontal flanges at one end of each unit and each plate is formed with a bifurcated end 32 that is adapted to receive the bottom flange of an adjacent roller unit. It is obvious that vertical movement of either roller unit will be transmitted to the adjacent unit.

In operation, a load passing in either direction over an articulated conveyer similar to that shown in Figures 1, 2, 3, 6 and 7, or in one direction over the form shown in Figure 6, will transmit the vertically downward force imposed on the rollers supporting the load at any instant, to the roller unit immediately in advance of, and immediately to the rear of the load, hence if the load has caused the rollers supporting the load to be displaced downwardly against the tension of the resilient elements, such downward displacement will be transmitted to the adjacent roller unit immediately in front of but not yet engaged by the load. This transmission of the downward force is accomplished by the previously described interconnections between adjacent roller units. Hence as the load approaches each roller unit immediately in advance of the load, such units will be entered smoothly under the load by reason of the advance unit tilting slightly to lower the roller ready to be engaged by the load to substantially the plane of the rollers already supporting the load. Thus the load moves smoothly over the conveyer.

It will be apparent that by reason of the aforementioned articulation, the resilient elements may be made more resilient, since the vertical displacement of each unit is controlled to an appreciable extent by the interconnection between adjacent units thereby stiffening the resilient action of the conveyer as a whole. In the form shown in Figures 2, 4, 6 and 7, the springs 10 may be pre-compressed to a less extent than a conveyer that is not articulated. In some instances, pre-compression may be eliminated entirely and coiled or other forms of springs of sufficient rigidity may be selected, whose action combined with the action of the articulation will produce a relatively smooth path of travel for the load with little effort required to move the same over the conveyer.

In Figure 3, the resilience of the rubber elements 20 may be controlled by pre-compression, or without pre-compression, and with any of the arrangements disclosed in my co-pending application above referred to.

While I have shown and described my invention as applied to a conveyer in which each unit is provided with two rollers, it is obvious that the invention could be applied equally well to conveyers having one or more rollers in each unit such as the types disclosed in the aforementioned Rishel applications and my co-pending application. In the claims appended hereto, the term "roller unit" is used in its broadest sense to include a single roller or a plurality of rollers mounted between laterally spaced supporting members. The foregoing and various other changes may be made without departing from the spirit of my invention as defined in the appended claims.

What I claim is:

1. In a conveyer, a plurality of resiliently mounted roller units, and means interconnecting said units whereby movement of the resilient mounting of one unit is transferred to an adjacent unit.

2. In a conveyer, a plurality of resiliently mounted roller units, and means interconnecting said units whereby movement of the resilient mounting of one unit is transferred to an adjacent unit, said means being rigidly connected to one unit and pivotally connected to the adjacent unit.

3. In a conveyer, a support, a plurality of roller units each movably mounted with respect thereto, and means interconnecting adjacent roller units and providing an articulated joint therebetween.

4. In a conveyer, a support, a plurality of roller units each mounted for limited movement toward and from said support, said units each having a rigidly extending portion engaging an adjacent unit.

5. In a conveyer, a plurality of roller units each mounted for limited movement toward and from the main support for said units, said units each having a rigidly extending portion, and means pivotally connecting the rigidly extending portions of one roller unit with an adjacent roller unit.

6. A conveyer comprising a support, a plurality of roller units resiliently mounted on said support, said units each having a roller supporting frame, and means interconnecting the frame of each roller unit with the frame of an adjacent roller unit whereby movement of the resilient mounting of one unit is transmitted to the resilient mounting of an adjacent unit.

7. A conveyer comprising a support, a plurality of roller units carried by said support, resilient means interposed between each roller unit and said support and permitting limited movement of said units with respect to said support, and means interconnecting each roller unit with an adjacent roller unit, said means being rigidly connected with one unit and hingedly connected to the adjacent unit.

8. A conveyer comprising a support, a plurality of roller units carried by said support, each roller unit having a frame for supporting one or more rollers, resilient means interposed between each frame and said support and permitting limited movement of each unit with respect to said support, said frames each having a rigidly extending portion connecting said frame with the frame of an adjacent roller unit.

9. A conveyer comprising a support, a plurality of roller units carried by said support, each roller unit having a frame for supporting one or more rollers, resilient means interposed between each frame and said support and permitting limited movement of each unit with respect to said support, said frames each having a rigid projection extending in overlapping relation to the frame of an adjacent roller unit, and means pivotally connecting the rigid projection of one roller unit with the frame of the adjacent roller unit.

10. In a conveyer, a support, a plurality of roller units each mounted for limited movement toward and from said support, said units each having a rigid portion supporting the rollers, said rigid portions having apertures intersecting the end edges thereof, and interconnecting means positioned in the apertures in each pair of adjacent units thereby to transmit vertical movement of one unit to the adjacent unit.

ARTHUR M. HAHN.